No. 844,951. PATENTED FEB. 19, 1907.
N. W. MILLS, I. F. MONELL & N. R. HERIVEL.
INSECT TRAP.
APPLICATION FILED SEPT. 24, 1906.
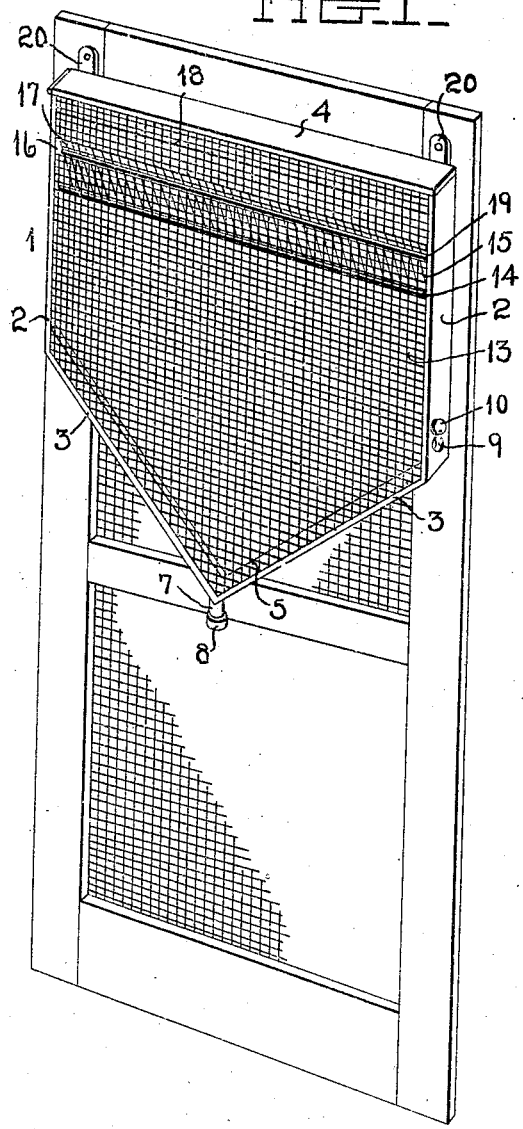
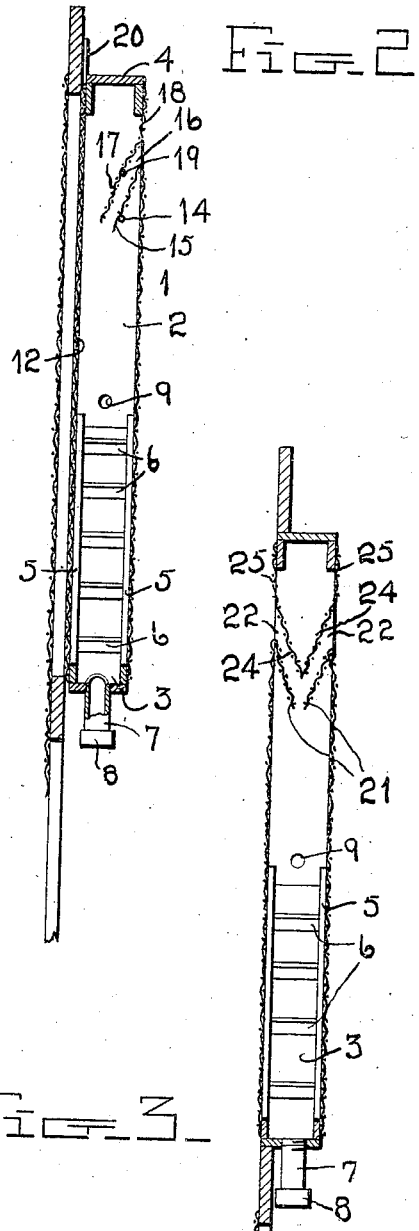
Witnesses
Inventors
Ira F. Monell,
N. R. Herivel and
N. W. Mills
by
Attorneys

UNITED STATES PATENT OFFICE.

NORMAN W. MILLS, IRA FERRIS MONELL, AND NICHOLAS R. HERIVEL, OF BOULDER, COLORADO.

INSECT-TRAP.

No. 844,951. Specification of Letters Patent. Patented Feb. 19, 1907.

Application filed September 24, 1906. Serial No. 335,933.

*To all whom it may concern:*

Be it known that we, NORMAN W. MILLS, IRA FERRIS MONELL, and NICHOLAS R. HERIVEL, citizens of the United States, residing at Boulder, in the county of Boulder and State of Colorado, have invented certain new and useful Improvements in Insect-Traps; and we do declare the following to be a full, clear, and exact description of the invention, such as will enable others skilled in the art to which it appertains to make and use the same.

This invention relates to improvements in insect-traps.

The object of the invention is to provide a fly-trap adapted to be applied to a door or window screen to catch flies or other insects trying to enter the same.

A further object is to construct a trap of this character which may be provided with a single entrance and applied to the outside or the inside of a door or window screen or which may be constructed with an entrance on both sides and set into the screen-frame to form a part of the screen.

With the above and other objects in view the invention consists of certain novel features of construction, combination, and arrangements of parts, as will be hereinafter described and claimed.

Figure 1 is a perspective view of a screen-door, showing the application of the invention thereto. Fig. 2 is a vertical cross-sectional view through the trap. Fig. 3 is a similar view of a modified form of trap, showing the same applied to a screen-door.

Referring more particularly to the drawings, 1 denotes the trap, which consists of an open frame of suitable size and thickness. The frame is formed of vertically-disposed parallel side strips 2, to the lower ends of which are connected downwardly-inclined bottom strips 3, which form a V-shaped lower edge or bottom to the trap. The top or upper edge of the frame is formed of a cover-strip 4, which is hinged to one of the side strips 2 or may be removably engaged with the upper end of the trap in any suitable manner.

The inclined bottom strips are provided along each edge with upwardly-projecting side flanges 5 and on their inner sides with a series of transversely-disposed cleats 6. On the bottom strips of the frame is placed insect-powder, the same being held in the frame by the flanges 5 and prevented from being jarred or shaken together by the shutting of the screen-door by means of the cleats 6.

In the lowermost point or angle of the screen-frame is arranged a discharge-tube 7, on the threaded lower end of which is adapted to be screwed a cap 8, which when removed from the tube 7 permits the discharge of the dead insects from the trap. In each of the side strips 2 of the frame, near their lower ends, are formed openings 9, through which insect-powder is placed upon the bottom of the trap. The openings 9 are closed by means of pivoted plates 10.

In Figs. 1 and 2 of the drawings the frame is shown as being completely closed on one side by a wire-netting 12. On the opposite or front side of the frame the lower portion is covered by netting 13, the upper end of which is folded or turned inwardly near the upper end of the frame over a cross-rod 14 to form the lower side 15 of the inlet-passage 16 of the trap. The upper side 17 of the passage is formed by a strip of netting 18, the upper portion of which is secured to the upper end of the frame, while the lower portion is bent inwardly to form the upper side 17 of the passage, the side 17 being held in position by means of a cross-rod 19, as shown.

To the upper end of the frame is secured apertured lugs 20, by means of which the trap may be hung on the side of a door or window screen in such position that when flies or other insects alight thereon they will readily enter through the passage 16 into the trap. The arrangement of the walls of the passage is such that the insects caught by the trap will not easily escape therethrough, but will be killed by falling into the insect-powder in the bottom of the trap.

In Fig. 3 of the drawings is shown a trap of slightly different form from that shown in Figs. 1 and 2. In the trap shown in Fig. 3 the netting on both sides of the frame is turned inwardly and downwardly near the upper end of the frames to form the lower walls 21 of an inlet-passage 22, which opens through each side of the trap. The upper walls of the passage 22 is formed by the inwardly-bent ends 24 of netting-strips 25, secured to the opposite sides near the upper end of the frame. The ends 24 of the strips 25 are brought together at their lower edges, as shown, thereby dividing the upper end of the passage 22 to form the two entrance-openings. The trap when formed as shown in Fig. 3 is adapted to be arranged in a door or window screen to form part of the same.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as defined by the appended claims.

Having thus described our invention, what we claim as new, and desire to secure by Letters Patent, is—

1. An insect-trap comprising an open frame, netting arranged on the sides of said frames to cover the same and bent inwardly and having an opening to form an inlet-passage and a discharge-tube arranged in said frame, substantially as described.

2. An insect-trap comprising an open frame, netting arranged on the lower sides of said frame, said netting being bent inwardly and downwardly to form the lower wall of an inlet-passage, netting secured to the upper side portion of said frame and bent inwardly to form the upper wall of said passage, a cover arranged on the upper end of said trap, a discharge-tube in the lower end of the same and a removable cap on said tube, substantially as described.

3. An insect-trap comprising an open frame, the lower side of which is formed of strips inclined downwardly toward the center of the trap, side flanges arranged on said bottom strips, cross-cleats arranged between said flanges, netting arranged on the sides of said frame to cover the same said netting having formed therein an inlet-passage, a cover to close the upper end of said trap, a discharge-tube in the bottom of the same, and a removable cap on the lower end of said tube, substantially as described.

4. An insect-trap, comprising an open frame consisting of apertured side strips, a top strip which is in the form of a cover, a bottom formed of downwardly and inwardly inclined strips, a discharge-tube arranged in said bottom, side flanges on said inclined strips, cleats between said flanges to receive insect-powder, cover-plates for said apertures, wire-netting sides arranged on the lower portions of said frame, said netting having its upper portions bent inwardly and downwardly to form the lower walls of an inlet-passage, netting-strips arranged on the upper portions of said frame, said netting having its lower edges bent inwardly to form the upper walls of said passage and dividing the same into entrances, opening from both sides of the screen, and cross-rods to hold the walls of said passage in place, substantially as described.

In testimony whereof we have hereunto set our hands in presence of two subscribing witnesses.

NORMAN W. MILLS.
IRA FERRIS MONELL.
NICHOLAS R. HERIVEL.

Witnesses:
A. A. VAN DEVER,
F. B. WEBSTER.